Nov. 8, 1938.  A. O. SARFF  2,135,536
FISHING SINKER
Filed Aug. 31, 1936

Inventor
AUSTIN O. SARFF

By Irving L. McCathran
Attorney

Patented Nov. 8, 1938

2,135,536

UNITED STATES PATENT OFFICE 2,135,536

FISHING SINKER

Austin O. Sarff, Walker, Minn.

Application August 31, 1936, Serial No. 98,780

6 Claims. (Cl. 43—52)

This invention relates to fishing line sinkers and has for one of its objects the production of a simple and efficient sinker which may be conveniently placed at any desired point within the length of a fishing line without the use of tools.

A further object of this invention is the production of a simple and efficient fishing line sinker preferably formed of lead or similar material so constructed as to permit the sinker to be easily attached to, removed from or adjusted within the length of a fishing line and at the same time cause the sinker to be firmly held in position upon the line without danger of accidentally slipping out of position.

Other objects and advantages will appear throughout the following specification and claims.

In the drawing:—

Figure 1:
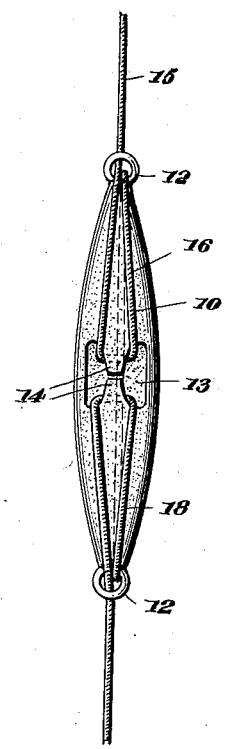
Figure 1 is a front elevational view of the sinker.
Figure 2:
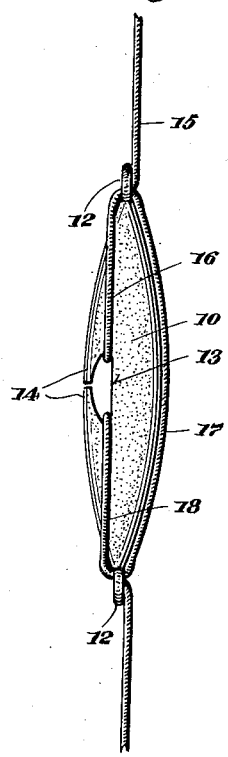
Figure 2 is a side view thereof.
Figure 3:
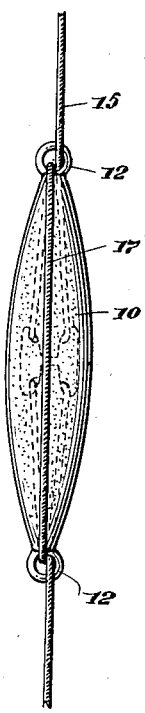
Figure 3 is a rear elevational view of the sinker.
Figure 4:
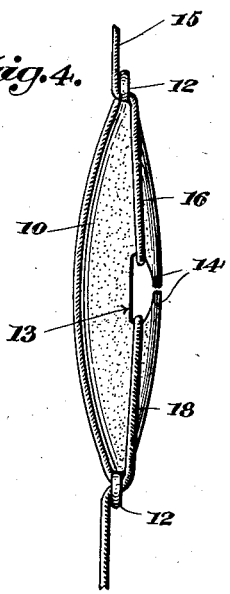
Figure 4 is a side view of the sinker, looking at the opposite side to that shown in Figure 2.

By referring to the drawing, it will be seen that 10 designates the body of the sinker which is preferably formed of lead and tapers towards each end as shown. A longitudinal wire 11 is cast in and extends through the center of the body and is provided at each end with an eye 12 extending beyond the ends of the body.

The body 10 is provided with a centrally located notch 13 upon one side thereof having overhanging closure tongues 14 formed integral with the body 10 and extending toward each other, the ends thereof being adapted to approximately contact to cause the tongues to constitute a closure for the notch 13, as will be hereinafter described and as shown in the drawing. Since the body of the sinker is formed of lead or similar material the body may be bent backwardly as shown in dotted lines in Figure 5 to move the ends of the tongues 14 apart and permit the fishing line to be inserted therebetween as will be described in the following.

Figure 5:
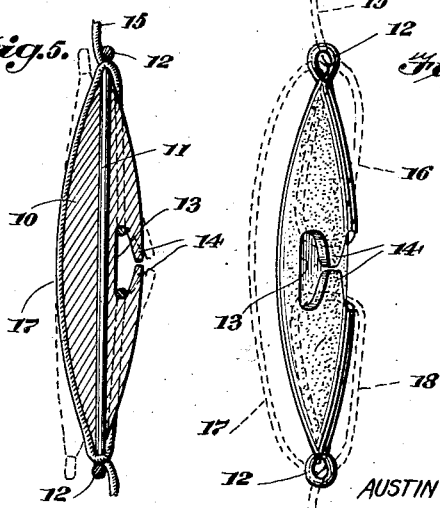
Figure 5 is a longitudinal sectional view of the sinker.

The sinker may be easily attached at any desired point within the length of the fishing line without the aid of tools and without the necessity of cutting the line simply by bending the body backwardly away from the notch 13 as shown in dotted lines in Figure 5, thereby moving the ends of the tongues 14 away from each other sufficiently to permit the fishing line 15 to be passed between the ends of the tongues 14. The line 15 is threaded through one of the eyes 12 and is then looped down over one of the tongues 14 to provide a loop 16. The line is then passed longitudinally of the back of the body 10 as shown at 17 and is then threaded through the opposite eye 12 and looped under the opposite tongue 14 to provide a loop 18, the loops 16 and 18 extending toward each other over the front face of the body 10. The opposite end of the line 15 is then threaded through the second eye as shown in Figure 1. It should be noted that the loop 16 fits under one tongue 14 and the loop 18 fits under the opposite tongue 14. After the line has been tightly drawn to fit snugly against the body 10, the body 10 is bent toward the notch 13 to the position as shown in full lines in Figure 5 to bring the ends of the tongues 14 toward each other to prevent accidental removal of the line 15 therefrom. One of the tongues 14 constitutes means cooperating with the other tongue 14 to retain the line 15 under the tongues against accidental release of the line from under the tongues.

Figure 6:
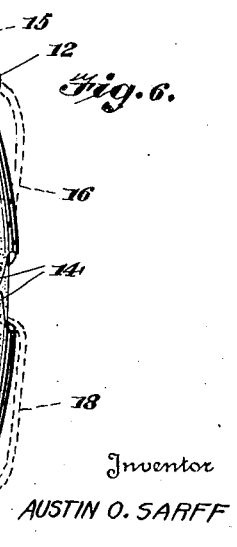
Figure 6 is a perspective view of the sinker, the fishing line being shown in dotted lines and in a loosened position.

The line 15 may be loosened as shown in dotted lines in Figure 6 to permit the sinker to be easily slid along the line to a desired adjusted position, where the line may be again drawn taut to firmly hold the sinker in place and against accidentally shifting along the length of the line. In this way the sinker may be easily adjusted without detaching or removing the sinker from the line. Furthermore the sinker may be easily and quickly replaced by other sinkers of different weights to suit the desire of the user. Due to the manner of attaching the sinker to the line, it should be understood that the line will not be damaged when in use or while it is being removed, adjusted or installed.

It should be understood that certain detail changes may be made in the structure of the device so long as these changes fall within the scope of the appended claims, and that it is not desired to limit the invention to a lead body, but any suitable material may be used, without departing from the spirit of the invention so long as the body may be flexed to open and close the notch 13.

Having described the invention, what is claimed as new is:—

1. A device of the class described comprising a body having line attachment means at its ends, said body having retaining tongues pointing toward each other intermediate its ends over which a line is adapted to be looped for securing said body to the line, the tongues being movable toward and away from each other to hold the line against displacement and also permit the line after it has been secured to be removed.

2. A sinker of the class described comprising a bendable body having line engaging means at its respective ends through which a fishing line is adapted to be threaded, said body having a line receiving notch formed upon one side intermediate its ends, overhanging tongues carried by said body and extending towards each other across said notch, and said tongues being adapted to be flexed towards or away from each other as said body is flexed in a selected direction, to permit the insertion and removal of the line from said notch.

3. A sinker of the class described comprising a bendable body having line receiving eyes at its ends, said body having a line receiving notch upon one side intermediate its ends, integral tongues extending from the edge of said notch and toward each other, the adjacent ends of said tongues being adapted to be positioned in close proximity to each other to substantially close said notch, and the ends of said tongues being movable to and from each other as said body is selectively flexed to open and substantially close said notch and permit a line to be placed in or removed from the notch.

4. In combination with a fishing line having a pair of loop portions extending toward each other, a bendable body having line receiving eyes at its ends through which said loops extend, said loops being connected by a portion of said line extending longitudinally of the back of the body, said body having a line receiving notch upon one face, integral tongues pointing toward each other and overhanging said notch over which tongues said loops are respectively looped, and said tongues having ends constituting means for holding said loops against displacement from said notch.

5. In combination with a fishing line having a pair of loop portions extending toward each other, a body having line receiving eyes at its ends, said body having a loop receiving notch on one side, tongues carried by said body and overhanging said notch to hold said loops in said notch, the loops being connected by a portion of the line extending along the back of said body, and said line being freely slidable when loosened through said notch and eyes, whereby said body may be freely adjusted upon the length of the line without detaching the body from the line.

6. A device of the class described comprising a body having a bendable tongue around which a line is adapted to be looped, the tongue extending in the direction of the longitudinal axis of the body in the opposite direction away from the normal direction of pull of the line which is adapted to be connected thereto, and means carried by the body and cooperating with the tongue to retain the line under the tongue, said body being adapted to be bent in one direction to move said means and tongue towards and in close proximity relative to each other to prevent accidental release of the line from under the tongue, said body also being adapted to be bent in the opposite direction to move said means and tongue apart to permit removal of the line from under said tongue.

AUSTIN O. SARFF.